(12) United States Patent
Hsiao et al.

(10) Patent No.: US 12,368,228 B2
(45) Date of Patent: Jul. 22, 2025

(54) WIRELESS DONGLE

(71) Applicant: Cheng Uei Precision Industry Co., LTD., New Taipei (TW)

(72) Inventors: Lan-Yung Hsiao, New Taipei (TW); Ping-Chun Lu, New Taipei (TW); Shao-Kai Sun, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 108 days.

(21) Appl. No.: 18/540,853

(22) Filed: Dec. 14, 2023

(65) Prior Publication Data

US 2024/0356195 A1 Oct. 24, 2024

(30) Foreign Application Priority Data

Apr. 18, 2023 (CN) .......................... 202320873417.3

(51) Int. Cl.
*H01Q 1/22* (2006.01)
*G06F 13/38* (2006.01)
*G06F 13/42* (2006.01)
*H01Q 9/04* (2006.01)

(52) U.S. Cl.
CPC ......... *H01Q 1/2275* (2013.01); *G06F 13/385* (2013.01); *G06F 13/4282* (2013.01); *H01Q 9/0407* (2013.01); *G06F 2213/0042* (2013.01)

(58) Field of Classification Search
CPC .. H01Q 1/2275; H01Q 9/0407; G06F 13/385; G06F 13/4282
See application file for complete search history.

(56) References Cited

U.S. PATENT DOCUMENTS

| | | | | |
|---|---|---|---|---|
| 8,618,986 | B2* | 12/2013 | Lan | H01Q 5/364 343/702 |
| 2006/0264178 | A1* | 11/2006 | Noble | H04K 3/46 455/67.11 |
| 2007/0035452 | A1* | 2/2007 | Lin | H01Q 1/2216 343/702 |
| 2007/0229366 | A1* | 10/2007 | Kim | H01Q 9/42 343/846 |
| 2013/0027264 | A1* | 1/2013 | Chua | H05K 5/0278 343/789 |

* cited by examiner

*Primary Examiner* — Hai V Tran
(74) *Attorney, Agent, or Firm* — Cheng-Ju Chiang

(57) ABSTRACT

A wireless dongle includes a circuit board, a universal serial bus connector, a wireless module and a printed antenna. The circuit board has a front edge, a rear edge, a left edge and a right edge. The universal serial bus connector is arranged at a middle of the front edge of the circuit board. The wireless module is arranged at a left area and a middle area of the circuit board. The universal serial bus connector is electrically connected to the wireless module. The wireless module includes a radio frequency chip. The radio frequency chip is arranged on a front right area of the wireless module. The printed antenna is arranged at a right area of the circuit board. The radio frequency chip is arranged between the universal serial bus connector and the printed antenna.

10 Claims, 4 Drawing Sheets

Start 2GHz  Stop 3GHz

WIRELESS DONGLE

CROSS-REFERENCE TO RELATED APPLICATIONS

The present application is based on, and claims priority from, China Patent Application No. 202320873417.3, filed Apr. 18, 2023, the disclosure of which is hereby incorporated by reference herein in its entirety.

PRIOR ART

With the rapid development of mobile communication in recent years, various mobile devices are gradually becoming wireless. At the same time, the mobile devices and peripheral devices are required higher and higher by people, and the mobile devices and the peripheral devices are expected to develop towards compact sizes that are easy to carry. The sizes of the mobile devices and the peripheral devices are smaller and smaller. Take a wireless dongle for example, a size of the wireless dongle is getting smaller and smaller, so an antenna disposed inside the wireless dongle must be reduced accordingly, so demands for the antennas are increased, the antennas work stably in a predetermined frequency band, and sizes of the antennas are smaller.

Therefore, it is necessary to provide a wireless dongle with a compact antenna layout. In a limited space condition, the antenna layout works stably in a predetermined frequency band.

BACKGROUND OF THE INVENTION

The present invention generally relates to a wireless dongle, and more particularly to a wireless dongle with a compact antenna layout.

SUMMARY OF THE INVENTION

An object of the present invention is to provide a wireless dongle with a compact antenna layout. The wireless dongle includes a circuit board, a universal serial bus connector, a wireless module and a printed antenna. The circuit board has a front edge, a rear edge opposite to the front edge, a left edge connected between two left ends of the front edge and the rear edge, and a right edge opposite to the left edge. The universal serial bus connector is arranged at a middle of the front edge of the circuit board, and the universal serial bus connector projects beyond the middle of the front edge of the circuit board. The wireless module is arranged at a left area and a middle area of the circuit board. The universal serial bus connector is electrically connected to the wireless module. The wireless module includes a radio frequency chip. The radio frequency chip is arranged on a front right area of the wireless module. The printed antenna is arranged at a right area of the circuit board. The radio frequency chip is arranged between the universal serial bus connector and the printed antenna. The printed antenna has a grounding section which is positioned close to a right of the radio frequency chip, a feed-in section positioned behind the grounding section, and a radiation section. A transverse edge of the grounding section is spaced from the front edge of the circuit board by a first clearance. The feed-in section is arranged next to the right of the radio frequency chip. And the feed-in section is separated from the grounding section. The radiation section is connected with two right ends of the grounding section and the feed-in section. The transverse edge of the grounding section is aligned with a transverse edge of the radiation section. The transverse edge of the grounding section and the transverse edge of the radiation section face the front edge of the circuit board. The radiation section is extended rearward to approach the rear edge of the circuit board, then is extended rightward along the rear edge of the circuit board and is further arched frontward and leftward to approach the right edge of the circuit board, later is extended frontward to approach the front edge of the circuit board from the right end of the grounding section to form a substantially U shape. A horizontal edge of the radiation section which is opposite to the transverse edge of the radiation section is spaced from the rear edge of the circuit board by the first clearance.

Another object of the present invention is to provide a wireless dongle with a compact antenna layout. The wireless dongle includes a circuit board, a universal serial bus connector, a wireless module and a printed antenna. The circuit board has a front edge, a rear edge opposite to the front edge, a left edge connected between two left ends of the front edge and the rear edge, and a right edge opposite to the left edge. The universal serial bus connector is arranged at a middle of the front edge of the circuit board, and the universal serial bus connector projects beyond the middle of the front edge of the circuit board. The wireless module is arranged at a left area and a middle area of the circuit board. The universal serial bus connector is electrically connected to the wireless module. The wireless module includes a radio frequency chip. The radio frequency chip is arranged on a front right area of the wireless module. The printed antenna is arranged at a right area of the circuit board. The radio frequency chip is arranged between the universal serial bus connector and the printed antenna. The printed antenna has a grounding section which is positioned close to a right of the radio frequency chip, a feed-in section positioned behind the grounding section, and a radiation section. A transverse edge of the grounding section is spaced from the front edge of the circuit board by a first clearance. The feed-in section is arranged next to the right of the radio frequency chip. And the feed-in section is separated from the grounding section. The radiation section is connected with two right ends of the grounding section and the feed-in section. The transverse edge of the grounding section is aligned with a transverse edge of the radiation section. The transverse edge of the grounding section and the transverse edge of the radiation section face the front edge of the circuit board. The radiation section is extended rearward to approach the rear edge of the circuit board, then is extended rightward along the rear edge of the circuit board and is further arched frontward and leftward to approach the right edge of the circuit board, later is extended frontward to approach the front edge of the circuit board from the right end of the grounding section to form a substantially U shape. A horizontal edge of the radiation section which is opposite to the transverse edge of the radiation section is spaced from the rear edge of the circuit board by the first clearance. The radiation section includes a first zone extended rearward from the grounding section, a second zone extended rightward from a rear end of the first zone, a third zone arched frontward and leftward from a right end of the second zone, a fourth zone extended frontward from a right end of the third zone, and a fifth zone extended leftward from a front end of the fourth zone, a vertical edge of the fifth zone faces a vertical edge of the first zone, the vertical edge of the fifth zone is separated from the vertical edge of the first zone by a second clearance.

Another object of the present invention is to provide a wireless dongle with a compact antenna layout. The wireless dongle includes a circuit board, a universal serial bus connector, a wireless module and a printed antenna. The circuit board has a front edge, a rear edge opposite to the front edge, a left edge connected between two left ends of the front edge and the rear edge, and a right edge opposite to the left edge. The universal serial bus connector is arranged at a middle of the front edge of the circuit board. The wireless module is arranged at a left area and a middle area of the circuit board. The universal serial bus connector is electrically connected to the wireless module. The wireless module includes a radio frequency chip. The radio frequency chip is arranged on a front right area of the wireless module. The printed antenna is arranged at a right area of the circuit board. The printed antenna is disposed to a right of the wireless module. The radio frequency chip is arranged between the universal serial bus connector and the printed antenna. The printed antenna has a grounding section which is positioned close to a right of the radio frequency chip, a feed-in section positioned behind the grounding section, and a radiation section. A transverse edge of the grounding section is spaced from the front edge of the circuit board by a first clearance. The feed-in section is arranged next to the right of the radio frequency chip. And the feed-in section is separated from the grounding section. The radiation section is connected with two right ends of the grounding section and the feed-in section. The transverse edge of the grounding section is aligned with a transverse edge of the radiation section. The transverse edge of the grounding section and the transverse edge of the radiation section face the front edge of the circuit board. The radiation section is extended rearward to approach the rear edge of the circuit board, then is extended rightward and is further arched frontward and leftward to approach the right edge of the circuit board, later is extended frontward to approach the front edge of the circuit board from the right end of the grounding section to form a substantially U shape. A horizontal edge of the radiation section which is opposite to the transverse edge of the radiation section is spaced from the rear edge of the circuit board by the first clearance. The radiation section includes a first zone extended rearward from the grounding section, a second zone extended rightward from a rear end of the first zone, a third zone arched frontward and leftward from a right end of the second zone, a fourth zone extended frontward from a right end of the third zone, and a fifth zone extended leftward from a front end of the fourth zone, an extending path of the first zone is parallel to an extending path of the fourth zone, and an extending path of the second zone is parallel to an extending path of the fifth zone.

As described above, the printed antenna of the wireless dongle with the compact antenna layout works in a limited space, and the printed antenna of the wireless dongle work stably in a predetermined frequency band, the printed antenna of the wireless dongle is adapted for a wireless miniaturization development trend of electronic products.

BRIEF DESCRIPTION OF DRAWINGS

The present invention will be apparent to those skilled in the art by reading the following description, with reference to the attached drawings, in which.

DETAILED DESCRIPTION OF THE INVENTION

Figure 1:
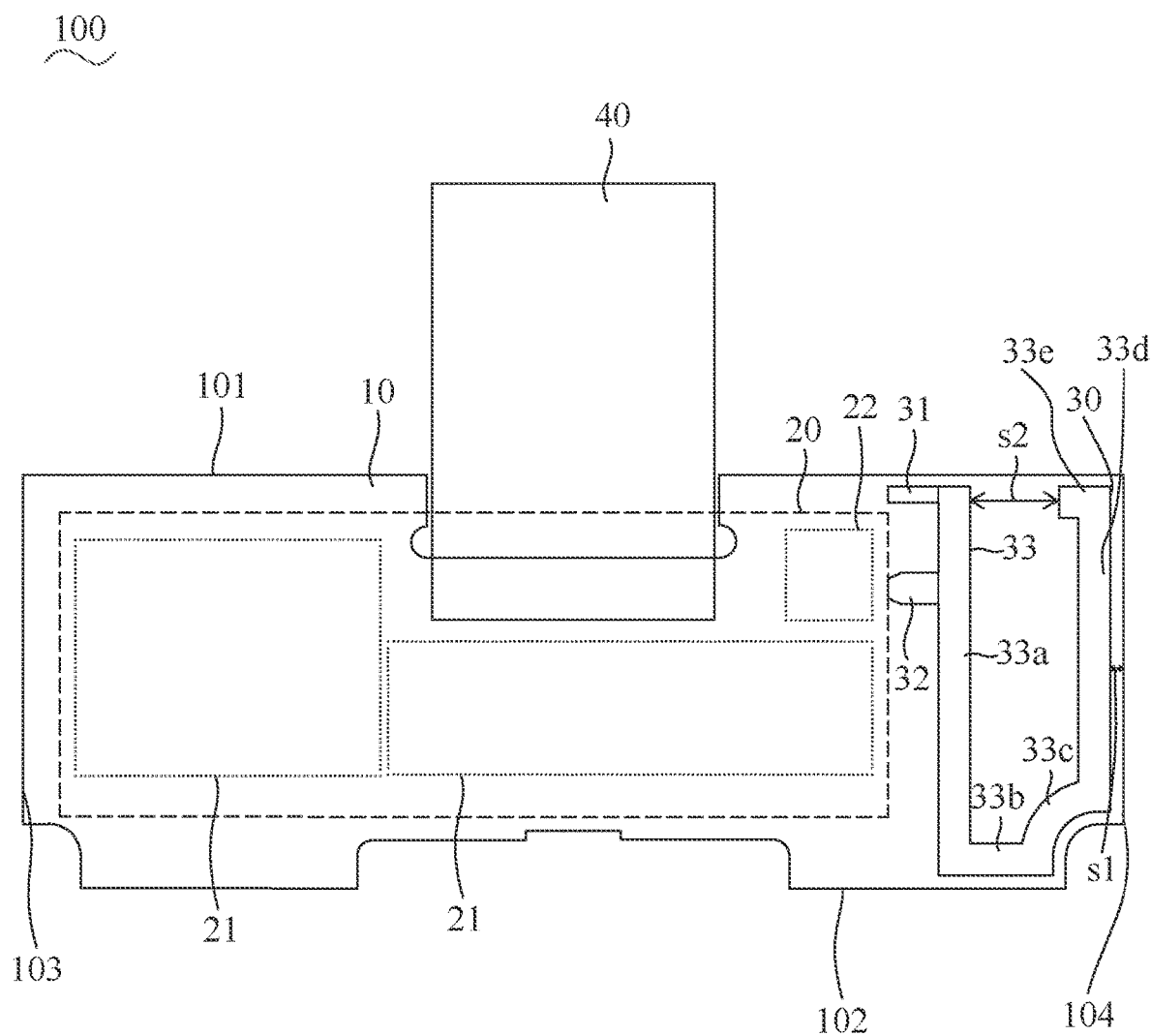
FIG. 1 is a front view of a wireless dongle according to a preferred embodiment of the present invention.

Referring to FIG. 1, a wireless dongle 100 in accordance with a preferred embodiment of the present invention is shown. The wireless dongle 100 includes a circuit board 10, a wireless module 20 and a printed antenna 30. The wireless module 20 and the printed antenna 30 are both arranged on the circuit board 10, and the wireless module 20 and the printed antenna 30 are electrically connected to each other. The wireless module 20 is able to be a Bluetooth module or a 2.4 GHz module.

The wireless dongle 100 includes a USB (Universal Serial Bus) connector 40. The universal serial bus connector 40 is disposed to the circuit board 10, and the universal serial bus connector 40 is electrically connected to the wireless module 20. After the wireless dongle 100 is inserted into a mobile device (such as a laptop) by a user, the mobile device is able to proceed with a wireless communication via the wireless dongle 100.

The circuit board 10 has a front edge 101, a rear edge 102 opposite to the front edge 101, a left edge 103 connected between two left ends of the front edge 101 and the rear edge 102, and a right edge 104 opposite to the left edge 103. The circuit board 10 is formed in a rectangular shape, and the circuit board 10 has two opposite long edges and two opposite short edges. In this preferred embodiment, the front edge 101 and the rear edge 102 of the circuit board 10 are the long edges, and the left edge 103 and the right edge 104 of the circuit board 10 are the short edges. The universal serial bus connector 40 is arranged at a middle of the front edge 101 of the circuit board 10, and the universal serial bus connector 40 projects beyond the middle of the front edge 101 of the circuit board 10. The wireless module 20 is arranged at a left area and a middle area of the circuit board 10. The printed antenna 30 is arranged at a right area of the circuit board 10.

In this preferred embodiment, the wireless module 20 is mounted on the left area and the middle area of the circuit board 10. The wireless module 20 includes a plurality of circuits 21 for proceeding with a data transmission and a data conversion. Each circuit 21 is selected from one of micro-controllers, filters, sensors, different type circuits and other different type components. A quantity of the plurality of the circuits 21 shown in FIG. 1 is only indicative, and the quantity of the plurality of the circuits 21 are without being limited. In this preferred embodiment, the wireless module 20 includes a RF (Radio Frequency) chip 22. The radio frequency chip 22 is arranged on a front right area of the wireless module 20. The radio frequency chip 22 is arranged between the universal serial bus connector 40 and the printed antenna 30. Because a layout of a metal shell of the USB connector 40 and a layout of the RF chip 22 both affect characteristics of the printed antenna 30, such as a voltage standing wave ratio (VSWR), a field pattern and a return loss, so a layout of the printed antenna 30 needs being matched with the layout of the metal shell of the USB connector 40 and the layout of the RF chip 22.

The printed antenna 30 is mounted on the right area of the circuit board 10. The printed antenna 30 is disposed to a right of the wireless module 20. The printed antenna 30 is a planar inverted-F antenna (PIFA). The printed antenna 30 has a grounding section 31, a feed-in section 32 and a radiation section 33. The grounding section 31 is rectangular. The grounding section 31 is positioned close to a right of the radio frequency chip 22. An outer edge of the radiation section 33 faces the right edge 104 of the circuit board 10. The outer edge of the radiation section 33 is separated from the right edge 104 of the circuit board 10 by a first clearance s1. A transverse edge of the grounding section 31 is spaced from the front edge 101 of the circuit board 10 by the first clearance s1. The radiation section 33 is connected with two right ends of the grounding section 31 and the feed-in section 32. The feed-in section 32 is positioned behind the grounding section 31, and the feed-in section 32 is separated from the grounding section 31. The feed-in section 32 is arranged next to the right of the RF chip 22 and the grounding section 31. The radiation section 33 is formed in a substantially U shape and a mouth of the radiation section 33 faces frontward. A front of one vertical edge of the radiation section 33 is connected with the grounding section 31. The one vertical edge of the radiation section 33 is connected with the feed-in section 32. The transverse edge of the grounding section 31 is aligned with a transverse edge of the radiation section 33. The transverse edge of the grounding section 31 and the transverse edge of the radiation section 33 face the front edge 101 of the circuit board 10. A horizontal edge of the radiation section 33 which is opposite to the transverse edge of the radiation section 33 is spaced from the rear edge 102 of the circuit board 10 by the first clearance s1.

Referring to FIG. 1, in this preferred embodiment, a specific shape of the radiation section 33 is described as follows. The radiation section 33 is extended rearward to approach the rear edge 102 of the circuit board 10, then is extended rightward along the rear edge 102 of the circuit board 10 and is further arched frontward and leftward to approach the right edge 104 of the circuit board 10, later is extended frontward to approach the front edge 101 of the circuit board 10 from the right end of the grounding section 31 to form the substantially U shape. The radiation section 33 includes a first zone 33a, a second zone 33b, a third zone 33c, a fourth zone 33d and a fifth zone 33e.

The first zone 33a is shown as a longitudinal rectangular strip shape. The first zone 33a is extended rearward from the right end of the grounding section 31. A transverse edge of the first zone 33a is aligned with the transverse edge of the grounding section 31, and the transverse edge of the first zone 33a is connected with the transverse edge of the grounding section 31. A left of the first zone 33a is connected with the right end of the feed-in section 32. The second zone 33b is extended rightward from a rear end of the first zone 33a. An extending path of the second zone 33b is shown as a transverse rectangular strip shape. The second zone 33b is shown as the transverse rectangular strip shape. The second zone 33b is extended along a direction which is parallel to the rear edge 102 of the circuit board 10. The third zone 33c is arched frontward and leftward from a right end of the second zone 33b, and the third zone 33c is shown as an arc shape. The third zone 33c is arranged at a lower right area of the circuit board 10. The fourth zone 33d is extended frontward from a right end of the third zone 33c. An extending path of the fourth zone 33d is shown as another longitudinal rectangular strip shape. The fourth zone 33d is shown as another longitudinal rectangular strip shape. The fourth zone 33d is extended along a direction which is parallel to the right edge 104 of the circuit board 10.

The fifth zone 33e is a short rectangular strip shape. The fifth zone 33e is extended leftward from a front end of the fourth zone 33d, and the fifth zone 33e is extended along a direction which is parallel to the front edge 101 of the circuit board 10. A vertical edge of the fifth zone 33e faces a vertical edge of the first zone 33a. The vertical edge of the fifth zone 33e is separated from the vertical edge of the first zone 33a by a second clearance s2. A transverse edge of the second zone 33b is spaced from the rear edge 102 of the circuit board 10 by the first clearance s1. An outer edge of the third zone 33c is spaced from a lower right arc edge of the circuit board 10 by the first clearance s1, and the lower right arc edge of the circuit board 10 is arched inward and leftward. An outer edge of the fourth zone 33d is spaced from the right edge 104 of the circuit board 10 by the first clearance s1. A transverse edge of the fifth zone 33e faces the front edge 101 of the circuit board 10. The transverse edge of the fifth zone 33e is separated from the front edge 101 of the circuit board 10 by the first clearance s1. An extending path of the first zone 33a is parallel to the extending path of the fourth zone 33d, and the extending path of the second zone 33b is parallel to an extending path of the fifth zone 33e.

Referring to FIG. 1 to FIG. 4, according to a layout of the wireless dongle 100 described above, the feed-in section 32 and the radiation section 33 of the printed antenna 30 are able to proceed with a mutual transmission, and the feed-in section 32 and the radiation section 33 are interacted with each other to oscillate electromagnetic waves with a frequency band which is ranged from 2.4 GHz to 2.5 GHz. In practice, the first clearance s1 is 0.2 mm, and the second clearance s2 is 2.5 mm.

When the printed antenna 30 of the wireless dongle 100 is used for a wireless communication, a current from the RF chip 22 of the wireless module 20 is fed by the feed-in section 32. The current passes through the radiation section 33, and the frequency band which is oscillated by the radiation section 33 is from 2.4 GHz to 2.5 GHz, so that the printed antenna 30 of the wireless dongle 100 is compact, and the printed antenna 30 of the wireless dongle 100 is able to work stably in the predetermined frequency band.

Figure 2:
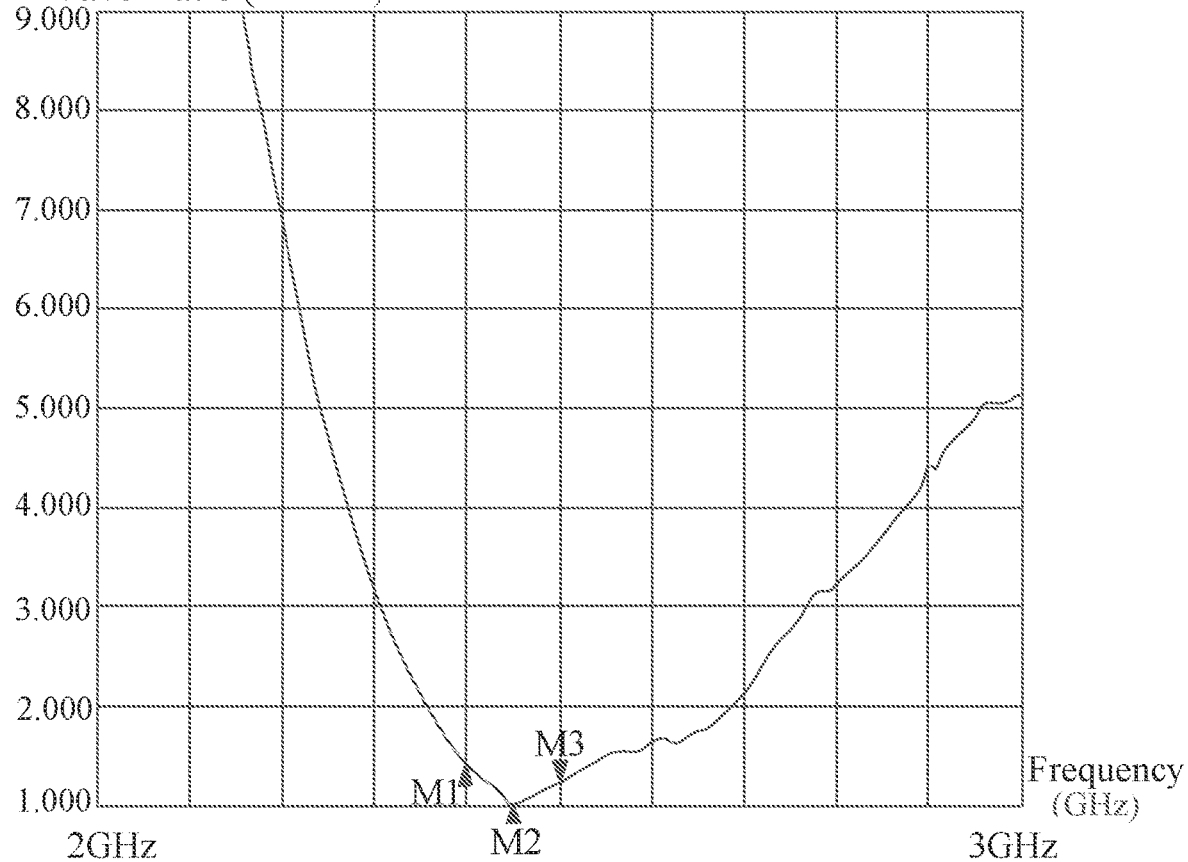
FIG. 2 is a voltage standing wave ratio (VSWR) chart of a printed antenna of the wireless dongle according to the preferred embodiment of the present invention.
Figure 3:
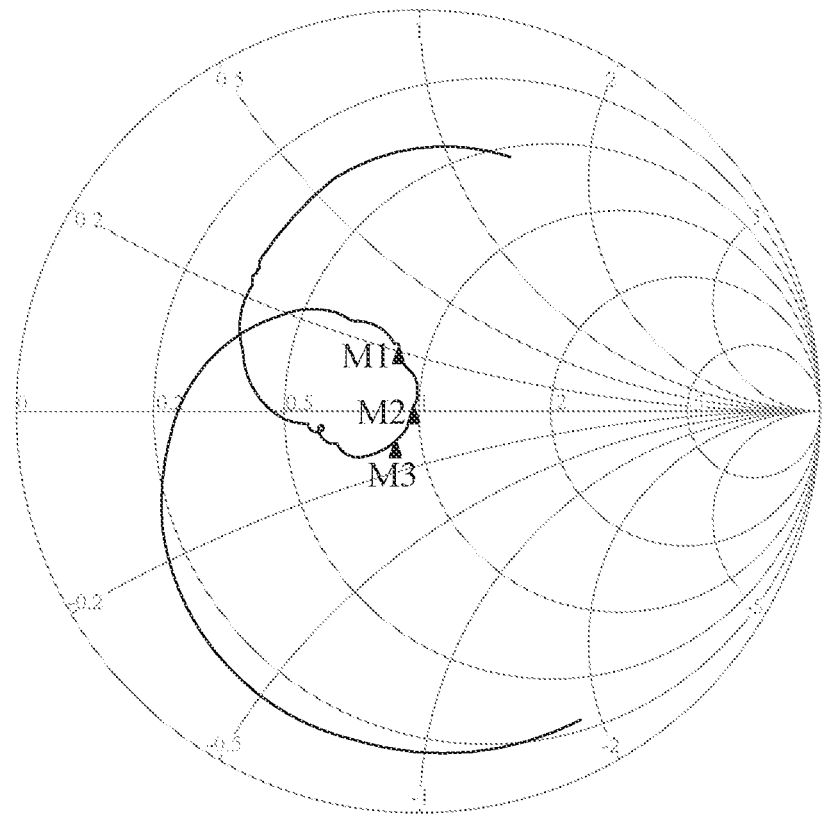
FIG. 3 is a smith chart of the printed antenna of the wireless dongle according to the preferred embodiment of the present invention.

Referring to FIG. 2 and FIG. 3, a voltage standing wave ratio (VSWR) chart of the printed antenna 30 of the wireless dongle 100 according to the present invention is shown in FIG. 2. A smith chart of the printed antenna 30 of the wireless dongle 100 according to the present invention is shown in FIG. 3. When the printed antenna 30 of the wireless dongle 100 works at 2.4 GHz, a VSWR value of the printed antenna 30 of the wireless dongle 100 is 1.3912 which is shown at a position M1 of FIG. 2. When the printed antenna 30 of the wireless dongle 100 works at 2.45 GHz, a VSWR value of the printed antenna 30 of the wireless dongle 100 is 1.0299 which is shown at a position M2 of FIG. 2. When the printed antenna 30 of the wireless dongle 100 works at 2.5 GHz, a VSWR value of the printed antenna 30 of the wireless dongle 100 is 1.2266 which is shown at a position M3 of FIG. 2. Therefore, the printed antenna 30 of the wireless dongle 100 according to the present invention is able to work stably at the frequency band which is ranged from 2.4 GHz to 2.5 GHz.

Figure 4:
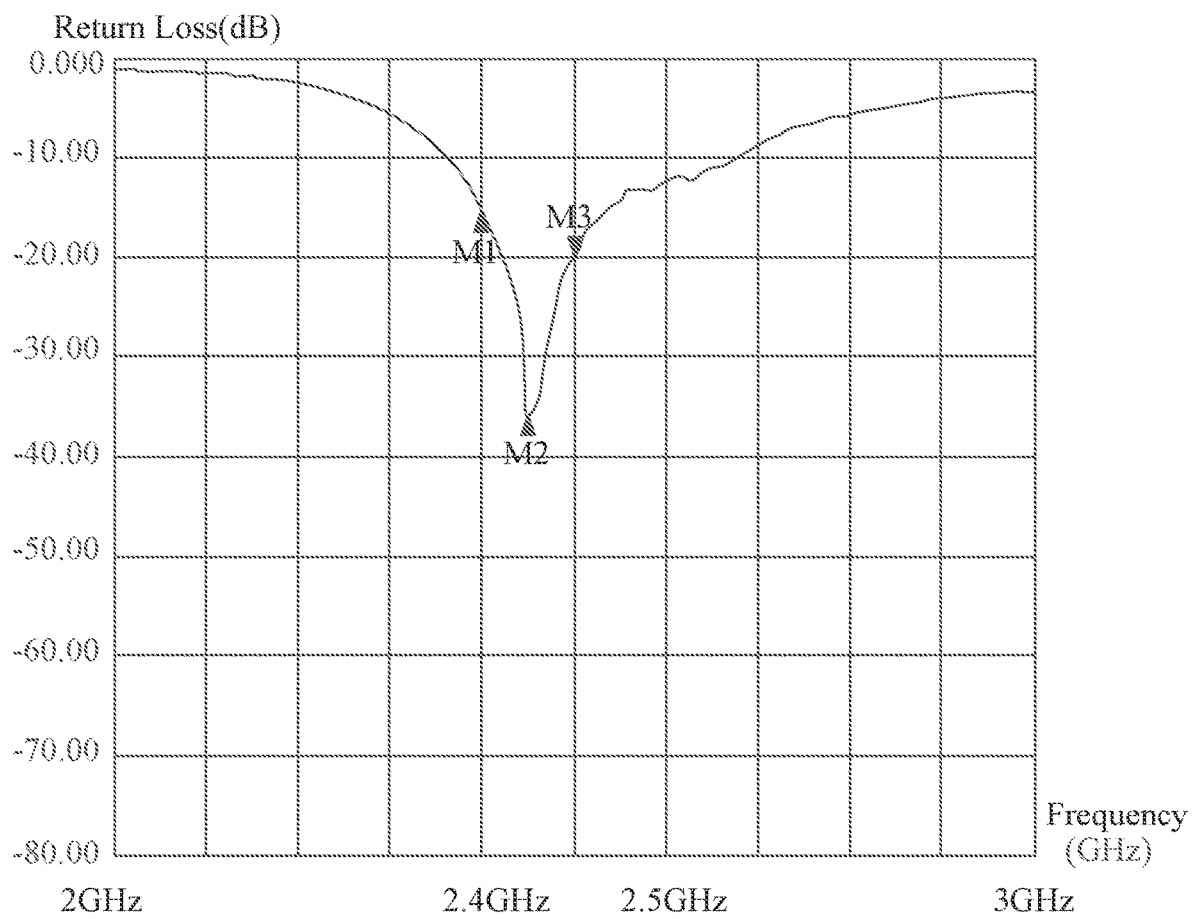
FIG. 4 is a return loss chart of the printed antenna of the wireless dongle according to the preferred embodiment of the present invention.

Referring to FIG. 1 and FIG. 4, when the printed antenna 30 of the wireless dongle 100 according to the present invention works at the frequency band which is ranged from 2.4 GHz to 2.5 GHz, a return loss of a bandwidth of the printed antenna 30 of the wireless dongle 100 is roughly within −40 dB, a loss degree of the printed antenna 30 of the wireless dongle 100 is small, and a radiation energy of the printed antenna 30 is large.

As described above, the printed antenna 30 of the wireless dongle 100 with a compact antenna layout works in a limited space, and the printed antenna 30 of the wireless dongle 100 work stably in the predetermined frequency band, the printed antenna 30 of the wireless dongle 100 is adapted for a wireless miniaturization development trend of electronic products.

What is claimed is:

1. A wireless dongle, comprising:
a circuit board having a front edge, a rear edge opposite to the front edge, a left edge connected between two left ends of the front edge and the rear edge, and a right edge opposite to the left edge;
a universal serial bus connector arranged at a middle of the front edge of the circuit board, and the universal serial bus connector projecting beyond the middle of the front edge of the circuit board;
a wireless module arranged at a left area and a middle area of the circuit board, the universal serial bus connector being electrically connected to the wireless module, the wireless module including a radio frequency chip, the radio frequency chip being arranged on a front right area of the wireless module; and
a printed antenna arranged at a right area of the circuit board, the radio frequency chip being arranged between the universal serial bus connector and the printed antenna, the printed antenna having:
a grounding section which is positioned close to a right of the radio frequency chip, a transverse edge of the grounding section being spaced from the front edge of the circuit board by a first clearance;
a feed-in section positioned behind the grounding section, the feed-in section being arranged next to the right of the radio frequency chip, and the feed-in section being separated from the grounding section; and
a radiation section connected with two right ends of the grounding section and the feed-in section, the transverse edge of the grounding section being aligned with a transverse edge of the radiation section, the transverse edge of the grounding section and the transverse edge of the radiation section facing the front edge of the circuit board, the radiation section being extended rearward to approach the rear edge of the circuit board, then being extended rightward along the rear edge of the circuit board and being further arched frontward and leftward to approach the right edge of the circuit board, later being extended frontward to approach the front edge of the circuit board from the right end of the grounding section to form a substantially U shape, a horizontal edge of the radiation section which is opposite to the transverse edge of the radiation section being spaced from the rear edge of the circuit board by the first clearance.

2. The wireless dongle as claimed in claim 1, wherein the radiation section includes a first zone extended rearward from the grounding section, a second zone extended rightward from a rear end of the first zone, a third zone arched frontward and leftward from a right end of the second zone, a fourth zone extended frontward from a right end of the third zone, and a fifth zone extended leftward from a front end of the fourth zone, a vertical edge of the fifth zone faces a vertical edge of the first zone, the vertical edge of the fifth zone is separated from the vertical edge of the first zone by a second clearance.

3. The wireless dongle as claimed in claim 2, wherein a transverse edge of the first zone is aligned with the transverse edge of the grounding section, and the transverse edge of the first zone is connected with the transverse edge of the grounding section, a left of the first zone is connected with the right end of the feed-in section.

4. The wireless dongle as claimed in claim 2, wherein a transverse edge of the second zone is spaced from the rear edge of the circuit board by the first clearance, an outer edge of the third zone is spaced from a lower right arc edge of the circuit board by the first clearance, and the lower right arc edge of the circuit board is arched inward and leftward, an outer edge of the fourth zone is spaced from the right edge of the circuit board by the first clearance, a transverse edge of the fifth zone faces the front edge of the circuit board, the transverse edge of the fifth zone is separated from the front edge of the circuit board by the first clearance.

5. The wireless dongle as claimed in claim 2, wherein the first zone is shown as a longitudinal rectangular strip shape, the second zone is shown as a transverse rectangular strip shape, the third zone is shown as an arc shape, the fourth zone is shown as another longitudinal rectangular strip shape, the fifth zone is a short rectangular strip shape.

6. The wireless dongle as claimed in claim 2, wherein an extending path of the first zone is parallel to an extending path of the fourth zone, and an extending path of the second zone is parallel to an extending path of the fifth zone.

7. The wireless dongle as claimed in claim 1, wherein the circuit board is formed in a rectangular shape.

8. The wireless dongle as claimed in claim 1, wherein the wireless module includes a plurality of circuits for proceeding with a data transmission and a data conversion.

9. A wireless dongle, comprising:
a circuit board having a front edge, a rear edge opposite to the front edge, a left edge connected between two left ends of the front edge and the rear edge, and a right edge opposite to the left edge;
a universal serial bus connector arranged at a middle of the front edge of the circuit board, and the universal serial bus connector projecting beyond the middle of the front edge of the circuit board;
a wireless module arranged at a left area and a middle area of the circuit board, the universal serial bus connector being electrically connected to the wireless module, the wireless module including a radio frequency chip, the radio frequency chip being arranged on a front right area of the wireless module; and
a printed antenna arranged at a right area of the circuit board, the radio frequency chip being arranged between the universal serial bus connector and the printed antenna, the printed antenna having:
a grounding section which is positioned close to a right of the radio frequency chip, a transverse edge of the grounding section being spaced from the front edge of the circuit board by a first clearance;
a feed-in section positioned behind the grounding section, the feed-in section being arranged next to the right of the radio frequency chip, and the feed-in section being separated from the grounding section; and
a radiation section connected with two right ends of the grounding section and the feed-in section, the transverse edge of the grounding section being aligned with a transverse edge of the radiation section, the transverse edge of the grounding section and the transverse edge of the radiation section facing the front edge of the circuit board;
wherein the radiation section is extended rearward to approach the rear edge of the circuit board, then is extended rightward along the rear edge of the circuit board and is further arched frontward and leftward to approach the right edge of the circuit board, later is extended frontward to approach the front edge of the circuit board from the right end of the grounding section to form a substantially U shape, a horizontal edge of the radiation section which is opposite to the transverse edge of the radiation section is spaced from the rear edge of the circuit board by the first clearance; and wherein the radiation section includes a first zone extended rearward from the grounding section, a second zone extended rightward from a rear end of the first zone, a third zone arched frontward and leftward from a right end of the second zone, a fourth zone extended frontward from a right end of the third zone, and a fifth zone extended leftward from a front end of the fourth zone, a vertical edge of the fifth zone faces a vertical edge of the first zone, the vertical edge of the fifth zone is separated from the vertical edge of the first zone by a second clearance.

10. A wireless dongle, comprising:

a circuit board having a front edge, a rear edge opposite to the front edge, a left edge connected between two left ends of the front edge and the rear edge, and a right edge opposite to the left edge;

a universal serial bus connector arranged at a middle of the front edge of the circuit board;

a wireless module arranged at a left area and a middle area of the circuit board, the universal serial bus connector being electrically connected to the wireless module, the wireless module including a radio frequency chip, the radio frequency chip being arranged on a front right area of the wireless module; and a printed antenna arranged at a right area of the circuit board, the printed antenna being disposed to a right of the wireless module, the radio frequency chip being arranged between the universal serial bus connector and the printed antenna, the printed antenna having:

a grounding section which is positioned close to a right of the radio frequency chip, a transverse edge of the grounding section being spaced from the front edge of the circuit board by a first clearance;

a feed-in section positioned behind the grounding section, the feed-in section being arranged next to the right of the radio frequency chip, and the feed-in section being separated from the grounding section; and a radiation section connected with two right ends of the grounding section and the feed-in section, the transverse edge of the grounding section being aligned with a transverse edge of the radiation section, the transverse edge of the grounding section and the transverse edge of the radiation section facing the front edge of the circuit board;

wherein the radiation section is extended rearward to approach the rear edge of the circuit board, then is extended rightward and is further arched frontward and leftward to approach the right edge of the circuit board, later is extended frontward to approach the front edge of the circuit board from the right end of the grounding section to form a substantially U shape, a horizontal edge of the radiation section which is opposite to the transverse edge of the radiation section is spaced from the rear edge of the circuit board by the first clearance; and wherein the radiation section includes a first zone extended rearward from the grounding section, a second zone extended rightward from a rear end of the first zone, a third zone arched frontward and leftward from a right end of the second zone, a fourth zone extended frontward from a right end of the third zone, and a fifth zone extended leftward from a front end of the fourth zone, an extending path of the first zone is parallel to an extending path of the fourth zone, and an extending path of the second zone is parallel to an extending path of the fifth zone.

* * * * *